_2,922,795_

BASIC ESTERS OF SUBSTITUTED BETA-HYDROXYPROPIONIC ACIDS

Frederick F. Blicke, Ann Arbor, Mich., assignor to Regents of The University of Michigan, Ann Arbor, Mich., a corporation of Michigan No Drawing. Application September 8, 1958
Serial No. 759,383

26 Claims. (Cl. 260—332.2)

This invention relates to basic esters of substituted β-hydroxypropionic acids having the formula

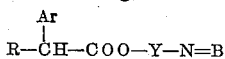

wherein Ar is a carbocyclic aromatic radical of 1–2 rings having less than about 15 carbon atoms, a thienyl radical or a lower-alkylated thienyl radical; Y is a lower-alkylene bridge having from 2 to about 5 carbon atoms; —N=B is a tertiary-amino radical, including di-lower-alkylamino radicals, polymethylenimino radicals having 5- to 8-membered rings and morpholino radicals; and R is a 1-hydroxyalkyl radical having from 4 to about 15 carbon atoms or a 1-hydroxycycloalkyl radical having from 5 to about 10 carbon atoms.

Pharmacological evaluation of these new compounds in the form of their water-soluble non-toxic salts by the Magnus method has indicated their usefulness as antispasmodic agents. They can be prepared for use as antispasmodic agents in the same way as other natural or synthetic antispasmodics such a atropine sulfate, adiphenine hydrochloride, and the like.

In the above formula, Ar, when a carbocyclic aromatic radical of 1–2 rings having less than about 15 carbon atoms, stands for a radical of the benzene, naphthalene or biphenyl series. The aromatic nucleus can be un-substituted, or it can be substituted by one or more substituents. The nature of the aromatic nucleus is not critical except insofar as the substituents must be inert toward the reagents used in the synthesis of the compounds, in particular toward organometallic compounds. Thus the substituents can include such substituents as alkyl, alkoxy and alkylmercapto radicals but not carboxy, cyano, hydroxy, primary amino and secondary amino radicals. On this basis, a preferred class of Ar for the invention consists of unsubstituted phenyl, naphthyl and biphenyl radicals, and such radicals substituted by from one to three substituents selected from the class consisting of lower-alkyl groups having from 1 to about 6 carbon atoms, lower-alkoxy groups having from 1 to about 6 carbon atoms and lower-alkylmercapto groups having from 1 to about 6 carbon atoms. Furthermore, said substituents can be in any of the available positions of the aromatic nucleus and where more than one, can be the same or different. Ar can therefore represent such groups as phenyl, p-tolyl, m-methoxyphenyl, p-methylmercaptophenyl, 3,4-dimethoxyphenyl, p-xenyl, 1-naphthyl, 2-naphthyl, 2-thienyl, 3-thienyl, 3-methyl-2-thienyl, 3,4-dimethyl-2-thienyl, and the like.

Y represents a lower-alkylene group or bridge having from 2 to about 5 carbon atoms and thus includes the straight chain polymethylene radicals, $(CH_2)_n$, where $n$ is 2–5, and branched chain radicals including such groups as

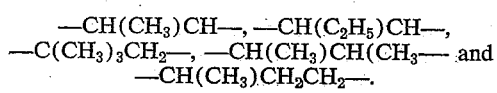

The —N=B portion of the molecule stands for a tertiary-amino radical of the aliphatic or cycloaliphatic type and includes di-lower-alkylamino, polymethylenimino and morpholino radicals. The alkyl groups of the di-lower-alkylamino radicals can be the same or different and each has less than about eight carbon atoms, the di-lower-alkylamino radicals thus including such groups as dimethylamino, diethylamino, methylethylamino, dipropylamino, diisopropylamino, dibutylamino, dipentylamino, dihexylamino, diheptylamino, and the like. The polymethylenimino radicals are simply cases where the alkyl groups of the di-lower-alkylamino groups are joined to produce a heterocyclic ring. The rings are 5- to 8-membered and thus include pyrrolidino, piperidino, hexamethylenimino and heptamethylenimino radicals and lower-alkylated derivatives thereof.

R represents, inter alia, a 1-hydroxyalkyl group having between 4 and about 15 carbon atoms. The numeral 1 of 1-hydroxyalkyl means that the hydroxy group is attached to the first carbon atom of the alkyl group which is the carbon atom immediately adjacent to the carbon atom bearing the aromatic substituent, Ar. The 1-hydroxyalkyl group may be straight or branched. R thus includes such groups as 1-hydroxybutyl, 1-hydroxyisobutyl, 1-hydroxy-1-methylpropyl, 1-hydroxy-1-ethylpropyl, 1-hydroxy-2-methylbutyl, 1-hydroxyhexyl, 1-hdroxydecyl, 1-hydroxy-1-hexylheptyl, and the like.

R also can represent a 1-hydroxycycloalkyl group having between 5 and about 10 carbon atoms. The numeral 1 of 1-hydroxycycloalkyl means that the hydroxy group is attached to the first carbon atom of the cycloalkyl group which is the carbon atom immediately adjacent to the carbon atom bearing the phenyl substituent. In the 1-hydroxycycloalkyl group the rings have from 5 to 8 members and these can be substituted by lower-alkyl groups. Thus the 1-hydroxycycloalkyl group includes such radicals as 1-hydroxycyclopentyl, 1-hydroxycyclohexyl, 1-hydroxycycloheptyl, 1-hydroxycyclooctyl, 2-methyl-1-hydroxycycloheptyl, 3-methyl-1-hydroxycyclohexy, 3,4-dimethyl-1-hydroxycyclohexyl, 4-methyl-1-hydroxycyclooctyl, and the like.

The new basic esters of substituted β-hydroxypropionic acids are conveniently prepared by esterification of the corresponding acids, R—CH(Ar)—COOH. The acids themselves are prepared in the following general manner: the acid, $ArCH_2COOH$, or a metallic salt thereof is caused to react with an alkylmagnesium halide to produce an organometallic derivative, XMgCH(Ar)—COOM, where X is halogen and M is a cation. The cation M is a simple metal ion if a salt of the acid is used as the starting material, and is halomagnesium if the free acid is used. The organometallic complex when reacted with an aliphatic aldehyde or ketone gives, after acidification, the desired substituted β-hydroxypropionic acid. The reaction of the organometallic complex and the carbonyl compound is carried out in a solvent inert under the conditions of the reaction, e.g., ether, benzene, toluene, or the like, preferably at a temperature between about 20° and 100° C.

The esters of the invention, having the general formula R—CH(Ar)—COO—Y—N=B, as described above, are prepared from the free acid by one of the following methods:

(1) The acid, R—CH(Ar)—COOH, is reacted with a tertiaryamino alkanol using a mineral acid, such as sulfuric acid, as a catalyst, present in an amount greater than that necessary to neutralize the amino alcohol. The sulfate or bisulfate salt of the basic ester is formed, and the free basic ester can be obtained by addition of alkali to the reaction mixture.

(2) The acid, R—CH(Ar)—COOH, is heated with a tertiaryaminoalkyl halide of the formula Z—Y—N=B, where Z is halogen (preferably chlorine or bromine). The temperature at which the reactants are heated is preferably between about 50° C. and 150° C. A hydrohalide of the basic ester is obtained which can be converted to the free basic ester by the addition of alkali to the reaction mixture.

(3) A metallic salt of the acid, R—CH(Ar)—COOH, is heated or simply mixed with a tertiary-aminoalkyl halide, Z—Y—N=B, where Z is halogen. In this case the free basic ester is formed directly.

These new basic esters are most conveniently used in the form of water-soluble acid-addition or quaternary ammonium salts, and these salts are within the purview of the invention. The acids which can be used to prepare acid-addition salts are those which are pharmacologically acceptable, i.e., those which produce when combined with the basic esters, salts whose anions are relatively innocuous to the animal organism in therapeutic doses of the salts, so that the beneficial physiological properties inherent in the basic esters are not vitiated by side-effects ascribable to the anions. Appropriate acid-addition salts are those derived from mineral acids such as hydrochloric acid, hydrobromic acid, hydriodic acid and sulfuric acid; and organic acids such as acetic acid, citric acid and tartaric acid. The quaternary ammonium derivatives are obtained by the addition to the free base of an ester of a strong acid, said ester having a molecular weight below about 250. A preferred class of quaternizing agents include lower-alkyl, lower-alkenyl or lower-aralkyl esters of strong inorganic acids or organic sulfonic acids, including such compounds as methyl chloride, methyl bromide, methyl iodide, ethyl bromide, propyl chloride, benzyl chloride, benzyl bromide, methyl sulfate, methyl benzenesulfonate and methyl p-toluenesulfonate.

All salts, whether toxic or non-toxic, are, however, useful as intermediates in the purification of the free bases or in the formation of other salts by ion exchange procedures. They also serve as characterizing derivatives of the free bases.

The following examples will further illustrate the invention, without the latter being limited thereby.

EXAMPLE 1

(a) α-(1-hydroxy-1-cyclohexyl)-α-phenylacetic acid: Magnesium (26.7 g., 1.10 moles) was placed in a thoroughly dried two-liter, three-necked flask fitted with a condenser, dropping funnel and stirrer. Enough dry ether was added to cover the magnesium followed by the addition of 1 cc. of ethyl bromide. After the reaction had begun there were added, successively, about 700 cc. of dry ether and 87.0 g. (0.55 mole) of sodium phenylacetate (which had been dried at 130° C.). The mixture was stirred, and 86.4 g. (1.10 moles) of isopropyl chloride, dissolved in 200 cc. of dry ether, was added dropwise at such a rate that the mixture continued to reflux. After the addition of the isopropyl chloride, the mixture was stirred and refluxed until no more gas was evolved (about two to two and one-half hours). The mixture was cooled to about 10° C. and, with stirring, 113.0 g. (1.15 moles) of cyclohexanone in 300 cc. of dry ether was added dropwise. After the cyclohexanone had been added the mixture was refluxed for three hours. The mixture was then cooled and hydrolyzed by very careful addition of water followed by dilute hydrochloric acid. The ether layer was separated, and the aqueous layer was extracted with ether. The combined ether layers were then extracted with sodium carbonate solution. The basic extracts were combined and carefully acidified with dilute hydrochloric acid. The acidic material which separated was extracted several times with ether and the combined ether extracts were dried over anhydrous magnesium sulfate. The ether was removed by distillation, and the residue (108.0 g., 83.8% yield) was recrystallized from toluene giving α-(1-hydroxy-1-cyclohexyl)-α-phenylacetic acid, M.P. 139–140° C.

(b) 2-diethylaminoethyl α-(1-hydroxy-1-cyclohexyl)-α-phenylacetate:

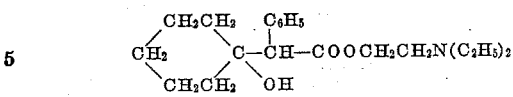

A solution of 4.67 g. (0.02 mole) of α-(1-hydroxy-1-cyclohexyl)-α-phenylacetic acid, prepared in part (a) above, and 3.4 g. (0.025 mole) of 2-diethylaminoethyl chloride in 75 cc. of isopropyl alcohol was refluxed for twelve hours. The isopropyl alcohol was refluxed for twelve hours. The isopropyl alcohol was then removed under reduced pressure, and ether was added to the oily residue which then solidified. Recrystallization of this material (5.7 g., 77.0% yield) from methyl ethyl ketone gave 2-diethylaminoethyl α-(1-hydroxy-1-cyclohexyl)-α-phenylacetate in the form of the hydrochloride which melted at 136.5–137.5° C.

Analysis.—Calcd. for $C_{20}H_{32}O_3NCl$: Cl, 9.59; N, 3.79. Found: Cl, 9.66; N, 3.77.

(c) The methobromide salt of 2-diethylaminoethyl α-(1-hydroxy-1-cyclohexyl)-α-phenylacetate was obtained by the addition of a 25% excess of methyl bromide to a solution of 3.0 g. of the free base dissolved in a mixture of alcohol and ether. After twenty-four hours at room temperature, the 3.1 g. of white crystalline compound which had precipitated was filtered and recrystallized from isopropyl alcohol, giving 2-diethylaminoethyl α-(1-hydroxy-1-cyclohexyl)-α-phenylacetate methobromide, melting at 192–193° C. (dec.)

Analysis.—Calcd. for $C_{21}H_{34}O_3NBr$: Br, 18.66; N, 3.27. Found: Br, 18.64; N, 3.22.

2-diethylaminoethyl α-(1-hydroxy-1-cyclohexyl)-α-phenylacetate methobromide was found to have an antispasmodic activity about 83% that of atropine sulfate when tested by the modified Magnus method [Luduena and Lands, J. Pharmacol. and Exptl. Therap. 110, 282 (1954)]. The $ALD_{50}$ value (the approximate dose lethal to 50% of the animals tested) when administered intravenously to mice was 13 mg. per kg. of body weight.

EXAMPLE 2

(a) 2-hexamethyleniminoethanol: Ethylene chlorohydrin (63.0 g., 0.782 mole) was added dropwise over a period of one and one-half hours, with periodic shaking, to 77.5 g. (0.782 mole) of hexamethylenimine [Ruzicka et al., Helv. Chim. Acta 32, 544 (1949)] heated on a steam bath. The mixture was then heated for an additional ten hours, cooled, and the brown solid which separated was treated with a solution of 35.0 g. (0.875 mole) of sodium hydroxide in 100 cc. of water. The mixture was extracted four times with a total of 200 cc. of benzene, the benzene portions were combined and dried over anhydrous potassium carbonate. The mixture was filtered, the solvent removed and the residue distilled under reduced pressure giving 71.1 g. (63.6%) of 2-hexamethyleniminoethanol, B.P. 114° C. (23 mm.).

The hydrochloride was prepared from a portion of the base in ether to which an ethereal solution of hydrogen chloride was added. The white precipitate thus obtained was recrystallized from butyl alcohol, giving 2-hexamethyleniminoethanol hydrochloride, M.P. 118–120° C.

Analysis.—Calcd. for $C_{18}H_{18}ONCl$: Cl, 19.73; N, 7.80. Found: Cl, 19.65; N, 7.77.

(b) 2 - hexamethyleniminoethyl chloride hydrochloride: Hexamethyleniminoethanol (40.0 g., 0.28 mole), obtained in part (a) above, dissolved in 25 cc. of benzene, was added dropwise to a stirred solution of 41.5 g. (0.35 mole) of thionyl chloride in 25 cc. of benzene. An exothermic reaction took place and the solution turned dark. After the addition the solution was refluxed for three hours, cooled, and the crystalline product was filtered and washed with benzene; yield 50.8 g. (91.5%). The product was recrystallized from isopropyl alcohol giving 2-hexamethyleniminoethyl chloride hydrochloride, melting at 202–204° C.

*Analysis.*—Calcd. for $C_8H_{17}NCl_2$: Cl, 35.79; N, 7.07. Found: Cl, 35.60; N, 7.03.

(c) 2-hexamethyleniminoethyl (1-hydroxy-1-cyclohexyl)-phenylacetate:

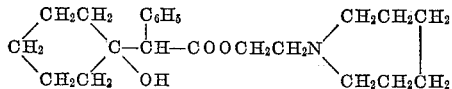

A cooled solution of 1.5 g. (0.0375 mole) of sodium hydroxide in 25 cc. of water was added carefully to 5.95 g. (0.03 mole) of 2-hexamethyleniminoethyl chloride hydrochloride, prepared in part (b) above, in a separatory funnel and covered with a layer of ether. The mixture was shaken, separated and the aqueous layer was extracted three times with a total of 100 cc. of ether. The ether portions were combined and dried over anhydrous magnesium sulfate. The mixture was filtered into a solution of 5.4 g. (0.023 mole) of (1-hydroxy-1-cyclohexyl)-phenylacetic acid, as prepared in Example 1, part (a), in 75 cc. of isopropyl alcohol, and the solvent was distilled through a 15 cm. Vigreaux column until the vapor temperature reached 80° C. The column was replaced by a reflux condenser and the solution was refluxed for ten hours. The hot solution was filtered, and the product precipitated from the filtrate after cooling. The 7.85 g. (85%) of compound thus obtained was recrystallized from isopropyl alcohol, giving 2-hexamethyleniminoethyl (1-hydroxy-1-cyclohexyl)-phenylacetate in the form of its hydrochloride, which melted at 184–185° C.

*Analysis.*—Calcd. for $C_{22}H_{34}O_3NCl$: Cl, 8.96; N, 3.54. Found: Cl, 8.88; N, 3.53.

EXAMPLE 3

(a) (1 - hydroxy - 1 - cyclohexyl) - (2 - thienyl)acetic acid was prepared starting with 4.9 g. (0.2 mole) of magnesium, 16.4 g. (0.1 mole) of sodium (2-thienyl)acetate in 150 cc. of ether, and 15.7 g. (0.2 mole) of isopropyl chloride in 50 cc. of ether according to the method described in Example 1, part (a). After the mixture had refluxed for several hours, it was cooled, and 21.6 g. (0.22 mole) of cyclohexanone in 50 cc. of ether was added. The preparation was continued and worked up as described in Example 1, part (a), giving 18.5 g. (77%) of (1-hydroxy-1-cyclohexyl)-(2-thienyl)acetic acid, M.P. 108–110° C. when recrystallized from a benzene-petroleum ether mixture.

Neut. equiv. calcd. for $C_{12}H_{16}O_3S$: 240.3. Found: 240.3.

(b) 2-diethylaminoethyl (1-hydroxy-1-cyclohexyl)-(2-thienyl)acetate:

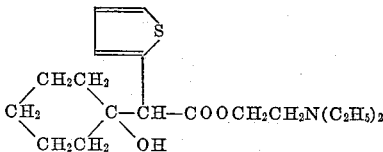

A solution of 5.3 g. (0.022 mole) of (1-hydroxy-1-cyclohexyl)-(2-thienyl)acetic acid, as prepared in part (a) above, and 3.8 g. (0.028 mole) of 2-diethylaminoethyl chloride in 75 cc. of isopropyl alcohol was refluxed for eight hours. The warm solution was filtered and the solvent removed from the filtrate. After the oily residue had been rubbed under ether for a short period, it solidified giving 6.6 g. (79.5%) of 2-diethylaminoethyl (1-hydroxy-1-cyclohexyl)-(2-thienyl) - acetate hydrochloride, M.P. 123–125° C. when recrystallized from methyl ethyl ketone.

*Analysis.*—Calcd. for $C_{18}H_{30}O_3NClS$: Cl, 9.43; N, 3.73. Found: Cl, 9.53; N, 3.66.

EXAMPLE 4

(a) (1-hydroxy - 1-cyclohexyl)-(3-thienyl)acetic acid was prepared starting with 4.9 g. (0.2 mole) of magnesium, 16.4 g. (0.1 mole) of sodium (3-thienyl)acetate in 150 cc. of ether, and 15.7 g. (0.2 mole) of isopropyl chloride in 50 cc. of ether according to the method described in Example 1, part (a). After the mixture had refluxed for four hours, it was cooled, and 21.6 g. (0.22 mole) of cyclohexanone was added. After the addition, the contents were refluxed for two hours and worked up as described in Example 1, part (a), giving 17.8 g. (74%) of (1-hydroxy-1-cyclohexyl)-(3-thienyl) acetic acid, M.P. 130.5–131.5° C. when recrystallized from a benzene-petroleum ether mixture.

Neut. equiv. calcd. for $C_{12}H_{16}O_3S$: 240.3. Found: 241.3.

(b) 2 - diethylaminoethyl (1-hydroxy-1-cyclohexyl)-(3-thienyl)acetate:

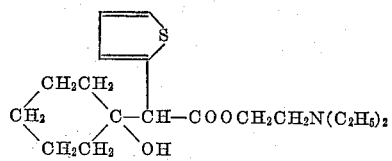

A solution of 5.4 g. (0.0225 mole) of (1-hydroxy-1-cyclohexyl)-(3-thienyl)acetate acid and 3.8 g. (0.028 mole) of 2-diethylaminoethyl chloride in 100 cc. of isopropyl alcohol was refluxed for fourteen hours. The solution was filtered while hot and allowed to cool, whereupon a white precipitate formed which was collected by filtration and washed with ether, giving 7.3 g. (86.5%) of 2-diethylaminoethyl (1-hydroxy-1-cyclohexyl)-(3-thienyl)acetate hydrochloride, M.P. 143–145° C. when recrystallized from isopropyl alcohol.

*Analysis.*—Calcd. for $C_{18}H_{30}O_3NClS$: Cl, 9.43; N, 3.73. Found: Cl, 9.55; N, 3.69.

EXAMPLE 5

(a) (1 - hydroxy-1-cyclopentyl)-phenylacetic acid was prepared starting with 4.9 g. (0.2 mole) of magnesium, 15.8 g. (0.1 mole) of sodium phenylacetate and 15.7 g. (0.2 mole) of isopropyl chloride according to the method described in Example 1, part (a). After the mixture had refluxed for several hours, it was cooled and 18.5 g. (0.22 mole) of cyclopentanone dissolved in ether was added. The preparation was continued and worked up as described in Example 1, part (a), giving 13.5 g. (61%) of (1-hydroxy-1-cyclopentyl)-phenylacetic acid, M.P. 99–100° C. when recrystallized from a benzene-petroleum ether mixture.

Neut. equiv. calcd. for $C_{13}H_{16}O_3$: 220.3. Found: 220.0.

(b) 2 - diethylaminoethyl (1-hydroxy-1-cyclopentyl)-phenylacetate:

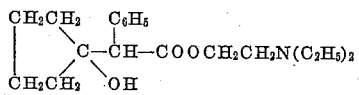

A solution of 5.0 g. (0.0227 mole) of (1-hydroxy-1-cyclopentyl)-phenylacetic acid as prepared in part (a) above, and 318 g. (0.028 mole) of 2-diethylaminoethyl chloride in 75 cc. of isopropyl alcohol was refluxed for ten hours, filtered, and the solvent removed under reduced pressure. The addition of anhydrous ether to the gummy residue converted it to a white powder, which was collected by filtration and washed with ether, giving 7.2 g. (89%) of 2-diethylaminoethyl (1-hydroxy-1-cyclopentyl)-phenylacetate as the hydrochloride, M.P. 133–135° C. when recrystallized from an isopropyl alcohol-isopropyl ether mixture.

*Analysis.*—Calcd. for $C_{19}H_{30}O_3NCl$: Cl, 9.96; N, 3.94. Found: Cl, 10.05; N, 3.89.

EXAMPLE 6

(a) (1-hydroxy-1-cyclopentyl)-(2-thienyl-acetic acid was prepared starting with 4.9 g. (0.2 mole) of magnesium, 16.4 g. (0.1 mole) of sodium (2-thienyl acetate and 15.7 g. (0.2 mole) of isopropyl chloride according to the method described in Example 1, part (a). After the mixture had refluxed for several hours, it was cooled and 18.5 g. (0.22 mole) of cyclopentanone in 200 cc. of ether was added. The preparation was continued and worked up as described in Example 1, part (a), giving 19.7 g. (87%) of (1-hydroxy-1-cyclopentyl)-(2-thienyl)acetic acid, M.P. 73–75° C. when recrystallized from a carbon tetrachloride-petroleum ether mixture.

Neut. equiv. calcd. for $C_{11}H_{14}O_3S$: 226.3. Found: 225.1.

(b) 2 diethylaminoethyl (1-hydroxy-1-cyclopentyl)-(2-thienyl)acetate:

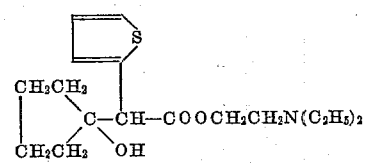

A solution of 5.1 g. (0.0225 mole) of (1-hydroxy-1-cyclopentyl)-(2-thienyl)acetic acid and 4.05 g. (0.03 mole) of 2-diethylaminoethyl chloride in 75 cc. of isopropyl alcohol was refluxed for fifteen hours. The warm solution was filtered and the solvent removed under reduced pressure. The residue was triturated with ether and the resulting solid was collected by filtration, giving 7.2 g. (88.4%) of 2-diethylaminoethyl (1-hydroxy-1-cyclopenyl)-(2-thienyl)acetate hydrochloride, M.P. 101.5–103.5° C. when recrystallized from methyl ethyl ketone.

Analysis.—Calcd. for $C_{17}H_{28}O_3NClS$: Cl, 9.80; N, 3.87. Found: Cl, 9.71; N, 3.90.

EXAMPLE 7

(a) (1 - hydroxy - 1-cyclohexyl)-(p-xenyl)acetic acid was prepared starting with 4.9 g. (0.2 mole) of magnesium, 23.4 g. (0.1 mole) of sodium (p-xenyl)acetate, 15.7 g. (0.2 mole) of isopropyl chloride and 200 cc. of ether according to the method described in Example 1, part (a). After the mixture had refluxed for four hours, it was cooled to 10° C., and 21.6 g. (0.22 mole) of cyclohexanone in 50 cc. of ether was added. The preparation was continued and worked up as described in Example 1, part (a), giving 25.8 g. (83.2%) of (1-hydroxy-1-cyclohexyl)-(p-xenyl)acetic acid, M.P. 215–216° C. when recrystallized from dioxane.

Neut. equiv. calcd. for $C_{20}H_{22}O_3$: 310.4. Found: 310.0.

(b) 2 - diethylaminoethyl (1-hydroxy-1-cyclohexyl)-(p-xenyl)acetate:

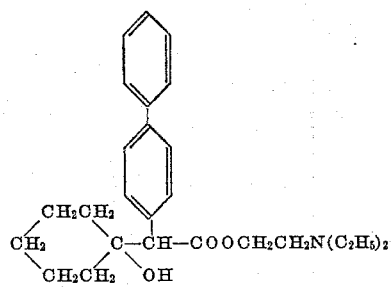

A solution of 5.0 g. (0.016 mole) of (1-hydroxy-1-cyclohexyl)-(p-xenyl)acetic acid and 2.9 g. (0.0215 mole) of 2-diethylaminoethyl chloride in 125 cc. of isopropyl alcohol was refluxed for fifteen hours. The hot solution was filtered, and the ester hydrochloride precipitated when the solution cooled, giving 6.1 g. (85%) of 2-diethylaminoethyl (1-hydroxy-1-cyclohexyl)-(p-xenyl)acetate hydrochloride, M.P. 168–170° C. when recrystallized from isopropyl alcohol.

Analysis.—Calcd. for $C_{26}H_{30}O_3NCl$: Cl, 7.95; N, 3.14. Found: Cl, 8.00; N, 3.10.

EXAMPLE 8

(a) 2 - phenyl - 3-hydroxy-4-methylpentanoic acid: Magnesium (4.9 g., 0.2 mole) was placed in a thoroughly dried three-necked flask fitted with a condenser, dropping funnel and stirrer. Enough dry ether was added to cover the magnesium followed by the addition of 1 cc. of ethyl bromide. After the reaction had been initiated there were added, successively, about 150 cc. of dry ether and 15.8 g. (0.1 mole) of sodium phenylacetate (which had been dried at 130° C.). The mixture was stirred, and 15.7 f. (0.2 mole) of isopropyl chloride, dissolved in 50 cc. of dry ether, was added dropwise at such a rate that the mixture continued to reflux. After the addition of the isopropyl chloride, the mixture was stirred and refluxed until no more gas was evolved (about two to two and one-half hours). The mixture was cooled to about 10° C. and, with stirring 15.8 g. (0.22 mole) of isobutyraldehyde in 50 cc. of dry ether was added dropwise. After the addition was completed the mixture was refluxed for two hours, then cooled and hydrolyzed by very careful addition of water followed by dilute hydrochloric acid. The ether layer was separated, and the aqueous layer was extracted with ether. The combined ether layers were then extracted wtih sodium carbonate solution. The basic extracts were combined and carefully acidified with dilute hydrochloric acid. The acidic material which separated was extracted several times with ether and the combined ether extracts were dried over anhydrous magnesium sulfate. The ether was removed by distillation and the residue was recrystallized from toluene, giving 13.1 g. (63%) of 2-phenyl-3-hydroxy-4-methylpentanoic acid, M.P. 126–127° C.

Neut. equiv. calcd. for $C_{12}H_{16}O_3$: 208.3. Found: 208.8.

(b) 2 - diethylaminoethyl 2 - phenyl - 3-hydroxy-4-methylpentanoate:

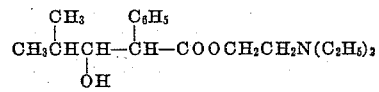

To a solution of 5.2 g. (0.025 mole) of 2-phenyl-3-hydroxy-4-methylpentanoic acid, as prepared in part (a) above, in 75 cc. of isopropyl alcohol, there was added 4.05 g. (0.03 mole) of 2-diethylaminoethyl chloride. The solution was refluxed for ten hours, filtered, and the solvent was removed at reduced pressure. Trituration of the colorless oily residue under ether produced 8.1 g. (94.2%) of 2-diethylaminoethyl 2-phenyl-3-hydroxy-4-methylpentanoate hydrochloride, M.P. 117–121° C. when recrystallized from a butyl alcohol-isopropyl ether mixture.

Analysis.—Calcd. for $C_{18}H_{30}O_3NCl$: Cl, 10.31; N, 4.07. Found: Cl, 10.30; N, 4.06.

2 - diethylaminoethyl 2 - phenyl-3-hydroxy-4-methylpentanoate hydrochloride was found to have an antispasmodic activity about 12% that of atropine sulfate when tested by the modified Magnus method [Luduena and Lands, J. Pharmacol. and Exptl. Therap. 110, 282 (1954)].

A portion of the hydrochloride obtained above was converted to the free base by treatment with aqueous sodium carbonate and extraction with ether. A solution of 3.0 g. of the free base in alcohol in ether solution was treated with 25% excess of methyl bromide. The 3.2 g. of white crystalline compound which precipitated was collected by filtration, washed with ether and recrystallized from acetone, giving 2-diethylaminoethyl 2-phenyl - 3-hydroxy-4-methylpentanoate methobromide, M.P. 162–163° C.

Analysis.—Calcd. for $C_{19}H_{32}O_3NBr$: Br, 19.86; N, 3.48. Found: Br, 19.80; N, 3.46.

2 - diethylaminoethyl 2 - phenyl-3-hydroxy-4-methylpentanoate methobromide was found to have an antispasmodic activity about 11% that of atropine sulfate when tested by the modified Magnus method. The ALD$_{50}$ value (approximate lethal dose in 50% of the animals) when administered intravenously to mice was 15 mg./kg. of body weight.

EXAMPLE 9

(a) 2-phenyl-3-hydroxy-4-ethylhexanoic acid was prepared starting with 4.9 g. (0.2 mole) of magnesium, 15.8 g. (0.1 mole) of sodium phenylacetate in 150 cc. of ether, and 15.7 g. (0.2 mole) of isopropyl chloride in 50 cc. of ether according to the method described in Example 1, part (a). After the mixture had refluxed for three hours, it was cooled to 10° C., and 22.0 g. (0.22 mole) of 2-ethylbutyraldehyde in 50 cc. of ether was added. The preparation was continued and worked up as described in Example 1, part (a) giving 17.5 g. (74%) of 2 - phenyl-3-hydroxy-4-ethyl-hexanoic acid, M.P. 98–100° C. after recrystallization from a toluene-petroleum ether mixture.

Neut. equiv. Cald. for $C_{14}H_{20}O_3$: 236.3. Found: 235.6.

(b) 2 - diethylaminoethyl 2 - phenyl-3-hydroxy-4-ethylhexanoate:

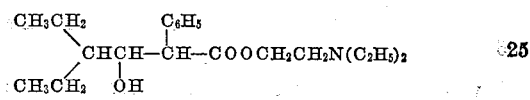

A solution of 5.2 g. (0.022 mole) of 2-phenyl-3-hydroxy-4-ethylhexanoic acid, as prepared in part (a) above, and 3.7 g. (0.027 mole) of 2-diethylaminoethyl chloride in 75 cc. of isopropyl alcohol was refluxed for eight hours, filtered, and the solvent removed under reduced pressure. The addition of anhydrous ether to the gummy residue converted it to a white powder, which was collected by filtration and washed with ether, giving 7.1 g. (86.7%) of 2-diethylaminoethyl 2-phenyl-3-hydroxy-4-ethylhexanoate as the hydrochloride, M.P. 143–144° C. when recrystallized from acetone.

Analysis.—Calcd. for $C_{20}H_{34}O_3NCl$: Cl, 9.53; N, 3.77. Found: Cl, 9.54; N, 3.72.

2-diethylaminoethyl 2-phenyl-3-hydroxy-4-ethylhexanoate was found to have an antispasmodic activity about 2.7% that of atropine sulfate when tested by the modified Magnus method.

EXAMPLE 10

(a) 2-phenyl-3-methyl-3-hydroxypentanoic acid was prepared starting with 4.8 g. (0.2 mole) of magnesium, 15.8 g. (0.1 mole) of sodium phenylacetate, 15.7 g. (0.2 mole) of isopropyl chloride and 200 cc. of ether according to the method described in Example 1, part (a). After the mixture had refluxed for four hours, it was cooled to 10° C., and 15.8 g. (0.22 mole) of 2-butanone was added. The preparation was continued and worked up as described in Example 1, part (a), giving 15.2 g. (72.9%) of 2-phenyl-3-methyl-3-hydroxypentanoic acid, M.P. 89–91° C. when recrystallized from a benzene-petroleum ether mixture.

Neut. equiv. calcd. for $C_{12}H_{16}O_3$: 208.3. Found: 210.0.

(b) 2-diethylaminoethyl 2-phenyl-3-methyl-3-hydroxypentanoate:

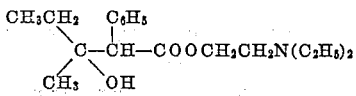

A solution of 5.2 g. (0.025 mole) of 2-phenyl-3-methyl-3-hydroxypentanoic acid, as prepared in part (a) above, and 4.05 g. (0.03 mole) of 2-diethylaminoethyl chloride in 100 cc. of isopropyl alcohol was refluxed for seven hours, filtered, and the solvent distilled under reduced pressure. The residue was rubbed under ether, and the resulting 6.8 g. (79%) of white solid was collected by filtration giving 2-diethylaminoethyl 2-phenyl-3-methyl-3-hydroxypentanoate hydrochloride, M.P. 96–98° C. when recrystallized from an ethyl alcohol-ether mixture.

Analysis.—Calcd. for $C_{18}H_{30}O_3NCl$: Cl, 10.31; N, 4.07. Found: Cl, 10.26; N, 4.09.

2-diethylaminoethyl 2-phenyl-3-methyl-3-hydroxypentanoate hydrochloride was found to have an antispasmodic activity about 7% that of atropine sulfate when tested by the modified Magnus method. The intravenous ALD$_{50}$ value in mice was 53 mg./kg.

EXAMPLE 11

(a) 2-phenyl-3-ethyl-3-hydroxypentanoic acid was prepared starting with 7.3 g. (0.3 mole) of magnesium, 23.7 g. (0.15 mole) of sodium phenylacetate in 200 cc. of ether, and 23.6 g. (0.3 mole) of isopropyl chloride in 75 cc. of ether according to the method described in Example 1, part (a). After the mixture had refluxed for three hours, it was cooled to 10° C., and 28.4 g. (0.33 mole) of diethyl ketone was added. The preparation was continued and worked up as described in Example 1, part (a) giving 27.2 g. (81.6%) of 2-phenyl-3-ethyl-3-hydroxypentanoic acid, M.P. 151–152° C. when recrystallized from 95% alcohol.

Neut. equiv. calcd. for $C_{13}H_{18}O_3$: 222.3. Found. 223.1.

(b) 2 - diethylaminoethyl 2 - phenyl - 3 - ethyl - 3 - hydroxypentanoate:

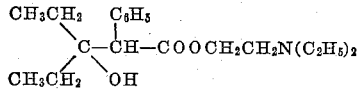

A solution of 5.1 g. (0.023 mole) of 2-phenyl-3-ethyl-3-hydroxypentanoic acid and 3.8 g. (0.028 mole) of 2-diethylaminoethyl chloride in 75 cc. of isopropyl alcohol was refluxed for nine hours, filtered, and the solvent removed under reduced pressure. Trituration of the colorless oily residue under ether gave a solid product which was collected by filtration, giving 6.9 g. (84.5%) of 2-diethylaminoethyl 2-phenyl-3-ethyl-3-hydroxypentanoate hydrochloride, M.P. 120–121° C. when recrystallized from ethyl acetate.

Analysis.—Calcd. for $C_{19}H_{32}O_3NCl$: Cl, 9.91; N, 3.91. Found: Cl, 9.94; N, 3.88.

2-diethylaminoethyl 2-phenyl-3-ethyl-3-hydroxypentanoate hydrochloride was found to have an antispasmodic activity about 3% that of atropine sulfate when tested by the modified Magnus method. The intravenous ALD$_{50}$ value in mice was 53 mg./kg.

EXAMPLE 12

(a) 2-phenyl-3-hydroxyhexanoic acid: To a stirred solution of isopropylmagnesium chloride [approximately 1 mole, prepared from 24.3 g. (1.0 mole) of magnesium turnings and 90 g. (1.15 moles) of isopropyl chloride] in 1200 ml. of anhydrous ether was added, dropwise, a solution of 68.1 g. (0.5 mole) of phenylacetic acid in 300 ml. of anhydrous benzene. The mixture was stirred and refluxed for sixteen hours. The cold mixture, adjusted to a volume of about 1500 ml. by the addition of anhydrous ether, was added, dropwise, a solution of 40 g. (0.55 mole) of butyraldehyde in 500 ml. of anhydrous ether. The stirred mixture was refluxed for three hours, then cooled and poured into a mixture of 125 ml. of concentrated hydrochloric acid and about 800 g. of ice with vigorous stirring to bring about hydrolysis of the Grignard complex. The benzene-ether layer was separated, washed with water, and extracted with a cold solution of 1.2 moles of sodium bicarbonate in 1 liter of water. The alkaline extract was washed with ether, cooled, and acidified with concentrated hydrochloric acid. The product which separated was collected by filtration, dried thoroughly in vacuo, and recrystallized from methyl ethyl ketone, giving 66.5 g. (64%) of 2-phenyl-3-hydroxyhexanoic acid, M.P. 152–154° C.

Analysis.—Calcd. for $C_{12}H_{16}O_3$: C, 69.20; H, 7.75. Found: C, 69.29; H, 7.99. Neut. equiv. calcd.: 208.3. Found: 207.6.

(b) 2-diethylaminoethyl 2-phenyl-3-hydroxyhexanoate:

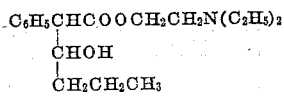

To a refluxing solution of 8.3 g. (0.04 mole) of 2-phenyl-3-hydroxyhexanoic acid in about 50 ml. of isopropyl alcohol was added, dropwise, over a period of about two hours 5.4 g. (0.04 mole) of 2-diethylaminoethyl chloride which had previously been dissolved in its own weight of anhydrous benzene. The solution was refluxed for an additional eight hours, and then filtered while hot to remove the small amount of self-condensation product of the 2-diethylaminoethyl chloride which usually formed during the course of the reaction. The cooled solution was diluted with anhydrous ether until the product began to separate, and then cooled at 0° C. for about sixteen hours. The product was collected by filtration, washed with anhydrous ether, and recrystallized from an isopropyl alcohol-methyl ethyl ketone mixture, giving 9.6 g. (70%) of 2-diethylaminoethyl 2-phenyl-3-hydroxyhexanoate in the form of its hydrochloride salt, M.P. 117–119° C.

*Analysis.*—Calcd. for $C_{18}H_{30}O_3NCl$: C, 62.87; H, 8.79; N, 4.07; Cl, 10.31. Found: C, 62.60; H, 9.08; N, 4.00; Cl, 10.24.

2-diethylaminoethyl 2-phenyl-3-hydroxyhexanoate hydrochloride was found to have an antispasmodic activity about 25% that of atropine sulfate when tested by the modified Magnus methd. The intravenous $ALD_{50}$ value in mice was 60 mg./kg.

A portion of the 2-diethylaminoethyl 2-phenyl-3-hydroxyhexanoate hydrochloride obtained above was converted to the free base by treatment with a slight excess of cold aqueous sodium carbonate and the free base was extracted with ether. The ether solution was dried and treated with a fourfold excess of methyl bromide at room temperature. After standing for twenty-four hours, the solution was cooled to 0° C. for from one to two days. The crystalline material which separated was collected by filtration and recrystallized from an isopropyl alcohol-methyl ethyl ketone mixture to give 2-diethylaminoethyl 2-phenyl-3-hydroxyhexanoate in the form of its methobromide salt, M.P. 135–136° C.

*Analysis.*—Calcd. for $C_{19}H_{32}O_3NBr$: C, 56.71; H, 8.02; N, 3.48; Br, 19.86. Found: C, 56.42; H, 8.04; N, 3.52; Br, 19.78.

2-diethylaminoethyl 2 - phenyl - 3 - hydroxyhexanoate methobromide was found to have an antispasmodic activity about 10% that of atropine sulfate when tested by the modified Magnus method. The intravenous $ALD_{50}$ value in mice was 18 mg./kg.

EXAMPLE 13

(a) 2-phenyl-3-hydroxyoctanoic acid was prepared from isopropylmagnesium chloride, phenylacetic acid and 1-hexanal according to the manipulative procedure described above in Example 12, part (a). There was thus obtained 2-phenyl-3-hydroxyoctanoic acid in 53% yield, M.P. 110–111° C. when recrystallized from benzene.

*Analysis.*—Calcd. for $C_{14}H_{20}O_3$: C, 71.16; H, 8.53. Found: C, 71.17; H, 8.65. Neut. equiv. calcd.: 236.3. Found: 236.3.

(b) 2-diethylaminoethyl 2-phenyl-3-hydroxyoctanoate:

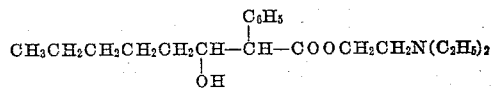

was prepared from 2-phenyl-3-hydroxyoctanoic acid and 2-diethylaminoethyl chloride according to the manipulative procedure described above in Example 12, part (b). The hydrochloride salt of 2-diethylaminoethyl 2-phenyl-3-hydroxyoctanoate was obtained in 80% yield and had the M.P. 106–107° C. when recrystallized from a benzene-ether mixture.

*Analysis.*—Calcd. for $C_{20}H_{34}O_3NCl$: C, 64.59; H, 9.21; N, 3.77; Cl, 9.53. Found: C, 64.47; H, 9.19; N, 3.79; Cl, 9.47.

The methobromide salt of 2-diethylaminoethyl 2-phenyl-3-hydroxyoctanoate had the M.P. 101–103° C. when recrystallized from an isopropyl alcohol-ether mixture.

*Analysis.*—Calcd. for $C_{21}H_{36}O_3NBr$: C, 58.60; H, 8.43; N, 3.25; Br, 18.57. Found: C, 58.76; H, 8.64; N, 3.26; Br, 18.41.

EXAMPLE 14

(a) 2-phenyl-3-hydroxynonanoic acid was prepared from isopropylmagnesium chloride, phenylacetic acid and 1-heptanal according to the manipulative procedure described above in Example 12, part (a). The 2-phenyl-3-hydroxynonanoic acid was obtained in 69% yield and had the M.P. 109–111° C. when recrystallized from a methyl ethyl ketone-petroleum ether mixture.

*Analysis.*—Calcd. for $C_{15}H_{22}O_3$: C, 71.96; H, 8.86. Found: C, 72.37; H, 9.10. Neut. equiv. calcd.: 250.3. Found: 250.0.

(b) 2-diethylaminoethyl 2-phenyl-3-hydroxynonanoate:

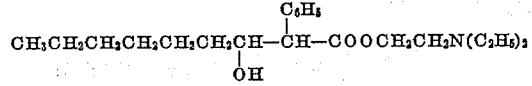

was prepared from 2-phenyl-3-hydroxynonanoic acid and 2-diethylaminoethyl chloride according to the manipulative procedure described above in Example 12, part (b). The hydrochloride salt of 2-diethylaminoethyl 2-phenyl-3-hydroxynonanoate was obtained in 68% yield and had the M.P. 102–103° C. when recrystallized from a benzene-ether mixture.

*Analysis.*—Calcd. for $C_{21}H_{36}O_3NCl$: C, 65.35; H, 9.40; N, 3.63; Cl, 9.18. Found: C, 65.30; H, 9.46; N, 3.60; Cl, 9.11.

2-diethylaminoethyl 2-phenyl-3-hydroxynonanoate hydrochloride was found to have an antispasmodic activity about 5% that of atropine sulfate when tested by the modified Magnus method. The intravenous $ALD_{50}$ value in mice was 31 mg./kg.

The methobromide salt of 2-diethylaminoethyl 2-phenyl-3-hydroxynonanoate had the M.P. 111–113° C. when recrystallized from an isopropyl alcohol-ether mixture.

*Analysis.*—Calcd. for $C_{22}H_{38}O_3NBr$: C, 59.45; H, 8.62; N, 3.15; Br, 17.98. Found: C, 59.11; H, 8.59; N, 3.14; Br, 17.84.

2-diethylaminoethyl 2 - phenyl - 3 - hydroxynonanoate methobromide was found to have an antispasmodic activity about 53% that of atropine sulfate when tested by the modified Magnus method. The intravenous $ALD_{50}$ value in mice was 6 mg./kg.

EXAMPLE 15

(a) 2-phenyl-3-hydroxy - 3 - methylnonanoic acid was prepared from isopropylmagnesium chloride, phenylacetic acid and 2-methyl-1-heptanal according to the manipulative procedure described above in Example 12, part (a).

(b) 2-diethylaminoethyl 2-phenyl-3-hydroxy-3-methylnonanoate:

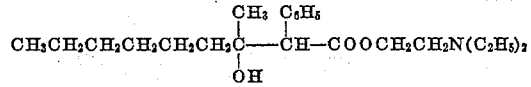

was prepared from 2-phenyl-3-hydroxynonanoic acid and 2-diethylaminoethyl chloride according to the manipulative procedure described above in Example 12, part (b). The hydrochloride salt had the M.P. 95–98° C. when recrystallized from ethyl acetate.

*Analysis.*—Calcd. for $C_{22}H_{38}O_3NCl$: C, 66.05; H, 9.58; Cl, 8.87. Found: C, 65.80; H, 9.60; Cl, 9.10.

EXAMPLE 16

(a) α - Phenyl-α-(1-hydroxy-2-methylcyclohexyl)acetic acid: To a stirred solution of isopropyl magnesium chloride (approximately 1 mole, prepared from 24.3 g. (1.0 mole) of magnesium turnings and 90 g. (1.15 moles) of isopropyl chloride) in 1200 ml. of anhydrous ether was added, dropwise, a solution of 68.1 g. (0.5 mole) of phenylacetic acid in 300 ml. of anhydrous benzene. The mixture was stirred and refluxed for sixteen hours. To the cold mixture, adjusted to a volume of about 1500 ml. by the addition of anhydrous ether, was added, dropwise, a solution of 62 g. (0.55 mole) of 2-methylcyclohexanone in 500 ml. of anhydrous ether. The stirred mixture was refluxed for three hours, then cooled and poured into a mixture of 125 ml. of concentrated hydrochloric acid and about 800 g. of ice with vigorous stirring to bring about hydrolysis of the Grignard complex. The benzene-ether layer was separated, washed with water, and extracted with a cold solution of 1.2 moles of sodium bicarbonate in 1 liter of water. The alkaline extract was washed with ether, cooled, and acidified with concentrated hydrochloric acid. The product which separated was collected by filtration, dried thoroughly in vacuo, and recrystallized from methyl ethyl ketone, giving 48 g. (39%) of α-phenyl-α-(1-hydroxy-2-methylcyclohexyl)acetic acid, M.P. 126–129° C.

*Analysis.*—Calcd. for $C_{15}H_{20}O_3$: C, 72.55; H, 8.12. Found: C, 72.61; H, 8.13. Neut. equiv. calcd.: 248.3. Found: 247.4.

(b) 2 - diethylaminoethyl α - phenyl - α - (1 - hydroxy-2-methylcyclohexyl)acetate:

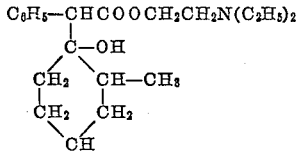

was prepared from α-phenyl-α-(1-hydroxy-2-methylcyclohexyl)acetic acid and 2-diethylaminoethyl chloride according to the manipulative procedure described in Example 1, part (b). The hydrochloride salt of 2-diethylaminoethyl α-phenyl-α-(1-hydroxy-2-methylcyclohexyl)-acetate thus obtained had the M.P. 158–160° C. when recrystallized from an ethanol-ether mixture.

*Analysis.*—Calcd. for $C_{21}H_{34}O_3NCl$: C, 65.69; H, 8.93; N, 3.65; Cl, 9.23. Found: C, 65.80; H, 8.92; N, 3.62; Cl, 9.27.

(c) The methobromide salt of 2-diethylmainoethyl α-phenyl-α-(1-hydroxy-2-methylcyclohexyl)acetate was prepared as follows: the hydrochloride salt obtained in part (b) above was treated with a slight excess of cold aqueous sodium carbonate and the free base thus liberated was extracted with ether. The ether solution was dried and treated with a fourfold excess of methyl bromide at room temperature. After standing for one day the solution was kept at 0° C. for one or two days. The product which separated was collected by filtration and recrystallized from an ethanol-ether mixture, giving the methobromide salt of 2-diethylaminoethyl α-phenyl-α-(1-hydroxy-2-methylcyclohexyl)acetate having the M.P. 190–192° C.

*Analysis.*—Calcd. for $C_{22}H_{36}O_3NBr$: C, 59.71; H, 8.21; N, 3.17; Br, 18.06. Found: C, 59.54; H, 8.24; N, 3.15; Br, 17.90.

The methobromide salt of 2-diethylaminoethyl α-phenyl-α-(1 - hydroxy - 2 - methylcyclohexy)acetate was found to have an antispasmodic activity about 32.4% that of atropine sulfate when tested by the modified Magnus method. The intravenous $ALD_{50}$ value in mice was 9 mg./kg.

The following additional α-phenyl-α-(1-hydroxy-cycloalkyl)acetic acids were prepared by reacting isopropylmagnesium bromide, phenylacetic acid, and the appropriate cycloalkanone, according to the manipulative procedure described above in Example 16, part (a):

Table 1(a)

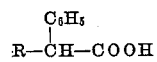

| | R | M.P., °C. |
|---|---|---|
| 1 | CH₂CH₂ / OH group with CH₂, CH CH₂, CH₃ | a 194–195 |
| 2 | CH₃—CH, CH₂CH₂, CH₂CH₂ / OH | a 177–178 |
| 3 | CH₂CH₂CH₂ / OH with CH₂, CH₂CH₂CH₂ | b 162–163 |
| 4 | CH₂CH₂CH₂ / OH with CH₂CH₂CH₂ | c 150–151 | a Recrystallized from methyl ethyl ketone.
b Recrystallized from toluene.
c Recrystallized from benzene-petroleum ether (30–40°).

Table 1(b)

ANALYSIS OF INTERMEDIATE ACIDS

| Compound | Formula | Neut. Equiv. | | Carbon | | Hydrogen | |
|---|---|---|---|---|---|---|---|
| | | Calcd. | Found | Calcd. | Found | Calcd. | Found |
| 1 | $C_{15}H_{20}O_3$ | 248.3 | 249.0 | 72.55 | 72.68 | 8.12 | 8.20 |
| 2 | $C_{15}H_{20}O_3$ | 248.3 | 248.0 | 72.55 | 72.36 | 8.12 | 8.27 |
| 3 | $C_{16}H_{22}O_3$ | 262.3 | 262.3 | 73.26 | 73.42 | 8.45 | 8.36 |
| 4 | $C_{15}H_{20}O_3$ | 248.3 | 248.9 | 72.55 | 72.71 | 8.12 | 8.35 |

The following additional salts of basic esters of α-phenyl-α-(1-hydroxycycloalkyl)acetic acids were prepared by esterification of the appropriate α-phenyl-α-(1-hydroxycycloalkyl)-acetic acid with the appropriate tertiary-aminoalkyl halide. The resulting hydrohalide salt was neutralized, followed by quaternization of the resulting basic ester with the appropriate quaternizing agent, all according to the manipulative procedures described above in parts (b) and (c) of Example 1.

Table 2(a)

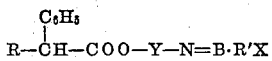

| Example | R | Y—N=B | R'X | M.P., °C. |
|---|---|---|---|---|
| 17 | CH₂CH₂ / OH with CH₂, CHCH₃, CH₃ | $CH_2CH_2N(C_2H_5)_2$ | HCl | f 150–152 |

Table 2(a)—Continued

| Example | R | Y—N=B | R'X | M.P., °C. |
|---|---|---|---|---|
| 18 | CH₂—CH₂—C(OH)(CHCH₃)—CH₂, with CH₃ branch | CH₂CH₂N(C₂H₅)₂ | CH₃Br | a 195–196 |
| 19 | CH₂—CH₂—C(OH)(CHCH₃)—CH₂, with CH₃ branch | CH₂CH₂N(C₂H₅)₂ | CH₂=CHCH₂Br | a 143–145 |
| 20 | CH₃CH—CH₂CH₂—C(OH)—CH₂CH₂ | CH₂CH₂N(C₂H₅)₂ | HCl | g 154–156 |
| 21 | CH₃CH—CH₂CH₂—C(OH)—CH₂CH₂ | CH₂CH₂N(C₂H₅)₂ | CH₃Br | a 194–196 |
| 22 | CH₃CH—CH₂CH₂—C(OH)—CH₂CH₂ | CH₂CH₂N(C₂H₅)₂ | CH₂=CHCH₂Br | a 153–155 |
| 23 | CH₂—CH₂CH₂—C(OH)—CH₂CH₂ | CH₂CH₂N(C₂H₅)₂ | C₆H₅COCH₂Br | b 200–202 (dec.) |
| 24 | CH₂—CH₂CH₂—C(OH)—CH₂CH₂ | CH₂CH₂N(C₂H₅)₂ | C₂H₅Br | a 175–176 |
| 25 | CH₂—CH₂CH₂—C(OH)—CH₂CH₂ | CH₂CH₂N(C₂H₅)₂ | CH₂=CHCH₂Br | a 152–154 |
| 26 | CH₂—CH₂CH₂—C(OH)—CH₂CH₂ | CH₂CH₂N(C₂H₅)₂ | C₆H₅CH₂Br | a 172–174 (dec.) |
| 27 | CH₂—CH₂CH₂—C(OH)—CH₂CH₂ | CH₂CH₂N(C₂H₅)₂ | CH₃Cl | c 158–160 |
| 28 | CH₂—CH₂CH₂CH₂—C(OH)—CH₂CH₂CH₂ | CH₂CH₂N(C₂H₅)₂ | HCl | f 144–146 |
| 29 | CH₂—CH₂CH₂CH₂—C(OH)—CH₂CH₂CH₂ | CH₂CH₂N(C₂H₅)₂ | CH₃Br | a 156–158 |
| 30 | CH₂CH₂CH₂—C(OH)—CH₂CH₂CH₂ | CH₂CH₂N(C₂H₅)₂ | HCl | f 142–143 |
| 31 | CH₂CH₂CH₂—C(OH)—CH₂CH₂CH₂ | CH₂CH₂N(C₂H₅)₂ | CH₃Br | d 174–175 |
| 32 | CH₂CH₂CH₂—C(OH)—CH₂CH₂CH₂ | CH₂CH₂N(CH₂CH₂CH₂)(CH₂CH₂CH₂)CH₂ | HCl | h 172–173.5 |
| 33 | CH₂CH₂CH₂—C(OH)—CH₂CH₂CH₂ | CH₂CH₂N(CH₂CH₂CH₂)(CH₂CH₂CH₂)CH₂ | CH₃Br | c 195–196 (dec.) | a Recrystallized from ethanol-ether.
b Recrystallized from ethanol.
c Recrystallized from methyl ethyl ketone.
d Recrystallized from isopropyl alcohol.
e Recrystallized from methyl ethyl ketone-ethanol.
f Recrystallized from acetone.
g Recrystallized from acetone-methyl ethyl ketone.
h Recrystallized from ethanol-ethyl acetate.

Table 2(b)
ANALYSIS OF COMPOUNDS OF TABLE 2(a)

| Example | Formula | Carbon Calcd. | Carbon Found | Hydrogen Calcd. | Hydrogen Found | Nitrogen Calcd. | Nitrogen Found | Halogen Calcd. | Halogen Found |
|---|---|---|---|---|---|---|---|---|---|
| 17 | $C_{21}H_{34}O_3NCl$ | 65.69 | 65.78 | 8.93 | 9.00 | 3.65 | 3.70 | 9.23 | 9.16 |
| 18 | $C_{22}H_{36}O_3NBr$ | 59.71 | 59.97 | 8.21 | 8.32 | 3.17 | 3.15 | 18.06 | 18.00 |
| 19 | $C_{24}H_{38}O_3NBr$ | 61.53 | 61.27 | 8.18 | 8.35 | 2.99 | 2.91 | 17.06 | 17.00 |
| 20 | $C_{21}H_{34}O_3NCl$ | | | | | 3.65 | 3.61 | 9.23 | 9.21 |
| 21 | $C_{22}H_{36}O_3NBr$ | 59.71 | 59.93 | 8.21 | 8.25 | 3.17 | 3.15 | 18.06 | 18.00 |
| 22 | $C_{24}H_{38}O_3NBr$ | 61.53 | 61.27 | 8.18 | 8.21 | 2.99 | 2.92 | 17.06 | 17.01 |
| 23 | $C_{28}H_{38}O_4NBr$ | 63.16 | 63.02 | 7.19 | 7.05 | 2.63 | 2.58 | 15.01 | 14.94 |
| 24 | $C_{22}H_{36}O_3NBr$ | 59.72 | 59.36 | 8.20 | 8.58 | 3.17 | 3.14 | 18.06 | 18.00 |
| 25 | $C_{23}H_{36}O_3NBr$ | 60.78 | 60.62 | 8.00 | 8.14 | 3.08 | 3.04 | 17.58 | 17.52 |
| 26 | $C_{27}H_{38}O_3NBr$ | 64.28 | 64.31 | 7.59 | 7.72 | 2.78 | 2.75 | 15.84 | 15.85 |
| 27 | $C_{21}H_{34}O_3NCl$ | | | | | 3.65 | 3.61 | 9.23 | 9.43 |
| 28 | $C_{22}H_{36}O_3NCl$ | | | | | 3.52 | 3.64 | 8.91 | 8.97 |
| 29 | $C_{23}H_{38}O_3NBr$ | 60.51 | 60.68 | 8.39 | 8.46 | 3.07 | 3.15 | 17.51 | 17.45 |
| 30 | $C_{21}H_{34}O_3NCl$ | | | | | 3.65 | 3.54 | 9.24 | 9.32 |
| 31 | $C_{22}H_{36}O_3NBr$ | | | | | 3.17 | 3.20 | 18.06 | 17.97 |
| 32 | $C_{24}H_{38}O_3NCl$ | 67.98 | 68.00 | 9.03 | 9.23 | | | 8.36 | 8.47 |
| 33 | $C_{25}H_{40}O_3NBr$ | 62.23 | 62.47 | 8.36 | 8.31 | | | 16.56 | 16.71 |

Table 2(c)
ACTIVITY AND TOXICITY OF QUATERNARY COMPOUNDS

| Example | Antispasmodic Activity (Percent Atropine) | Toxicity $ALD_{50}$ (i.v. mice) |
|---|---|---|
| 18 | 27.5 | 16 |
| 19 | 17 | 7 |
| 21 | 80 | 9 |
| 22 | 48 | |
| 23 | 33 | 22 |
| 24 | 118 | 15 |
| 25 | 70.5 | 9 |
| 26 | 28 | 42 |
| 27 | | |
| 29 | 53 | 1 |
| 31 | 41 | 10 |
| 33 | | 6 |

By the methods described in the preceding examples, the following compounds can also be prepared:

2-diethylamino - 1 - methylethyl - 2(2-naphthyl)-3-hydroxyoctanoate:

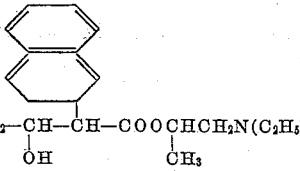

$CH_3(CH_2)_3CH_2—CH—CH—COOCHCH_2N(C_2H_5)_2$
$\phantom{CH_3(CH_2)_3CH_2—CH—CH—COO}|\phantom{CH_2N(C_2H_5)_2}$
$\phantom{CH_3(CH_2)_3CH_2—}OH\phantom{—COO}CH_3$ by reaction of 2-(2-naphthyl)-3-hydroxyoctanoic acid and 2-diethylamino-1-methylethyl halide. Said acid can be prepared by reaction of the Grignard derivative of 2-naphthylacetic acid and n-hexaldehyde.

2-pyrrolidinoethyl 2-phenyl-3-hydroxy - 3 - ethyl-hexanoate:

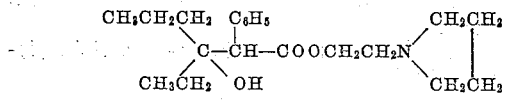

by reaction of 2-phenyl-3-hydroxy-3-ethylhexanoic acid and 2-pyrrolidinoethyl halide. Said acid can be prepared by reaction of the Grignard derivative of phenylacetic acid and ethyl propyl ketone.

2 - piperidinoethyl 2-(2-thienyl)-3-hydroxy-3-ethylpentanoate:

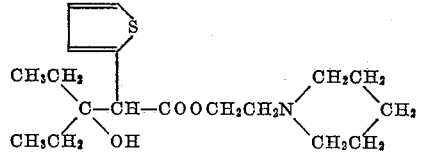

by reaction of 2-(2-thienyl)-3-hydroxy-3-ethylpentanoic acid and 2-piperidinoethyl halide. Said acid can be prepared by reaction of the Grignard derivative of 2-thienylacetic acid and diethyl ketone.

3-dibutylaminopropyl 2-phenyl-3-heptyl-3 - hydroxy-decanoate

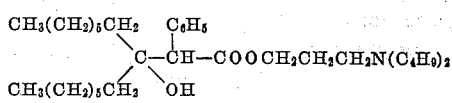

by reaction of 2-phenyl-3-heptyl-3-hydroxydecanoic acid and 3-dibutylaminopropyl halide. Said acid can be prepared by reaction of the Grignard derivative of phenylacetic acid and di-n-heptyl ketone.

2-morpholinoethyl 2-(p-methoxyphenyl)-3 - hydroxy-3-isopropyl-4-methylpentanoate:

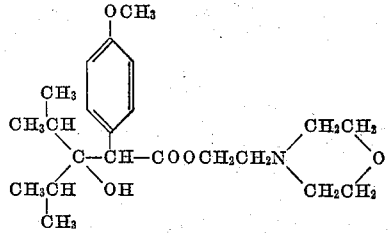

by reaction of 2-(p-methoxyphenyl)-3-hydroxy-3-isopropyl-4-methylpentanoic acid and 2-morpholinoethyl halide. Said acid can be prepared by reaction of the Grignard derivative of p-methoxyphenylacetic acid and diisopropyl ketone.

2-dimethylaminoethyl 2-(o-tolyl)-3-hydroxyundecylate:

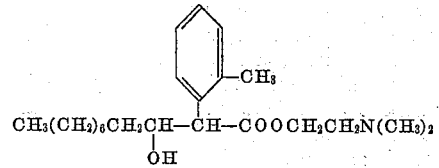

by reaction of 2-(o-tolyl)-3-hydroxyundecylic acid and 2-dimethylaminoethyl halide. Said acid can be prepared by reaction of the Grignard derivative of o-tolylacetic acid and n-nonyl aldehyde.

2-diethylamioethyl 2-(p-methylmercaptophenyl)-3-hydroxy-4-methylpentanoate:

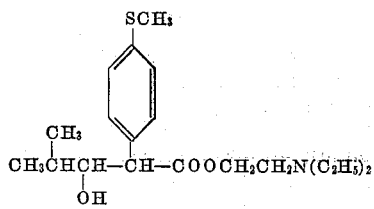

by reaction of 2-(p-methylmercaptophenyl)-3-hydroxy-4-methylpentanoate and 2-diethylaminoethyl halide. Said acid can be prepared by reaction of the Grignard derivative of p-methylmercaptophenylacetic acid and isobutyraldehyde.

5-dimethylaminopentyl (1-hydroxycyclopentyl)-phenylacetate:

$$\begin{array}{c} CH_2CH_2 \quad C_6H_5 \\ \diagdown \quad | \\ \quad C-CH-COOCH_2CH_2CH_2CH_2CH_2N(CH_3)_2 \\ \diagup \\ CH_2CH_2 \end{array}$$

by reaction of (1-hydroxycyclopentyl)-phenylacetic acid and 5-dimethylaminopentyl halide.

2-diethylaminoethyl (5-methyl-2-thienyl)-(1-hydroxycyclohexyl)acetate:

$$\begin{array}{c} CH_3 \\ \phantom{x} \\ \text{[thienyl ring]} \\ CH_2CH_2 \\ \diagup \quad \diagdown \\ CH_2 \quad\quad C-CH-COOCH_2CH_2N(C_2H_5)_2 \\ \diagdown \quad \diagup \quad | \\ CH_2CH_2 \quad OH \end{array}$$

by reaction of (5-methyl-2-thienyl)-(1-hydroxycyclohexyl)-acetic acid and 2-diethylaminoethyl halide.

2-heptamethyleniminoethyl (1-hydroxycyclohexyl)-phenylacetate:

$$\begin{array}{c} CH_2CH_2 \quad C_6H_5 \quad\quad\quad CH_2CH_2CH_2 \\ \diagup \quad | \quad\quad\quad\quad \diagup \\ CH_2 \quad C-CH-COOCH_2CH_2N \quad CH_2 \\ \diagdown \quad \diagup \quad\quad\quad\quad \diagdown \\ CH_2CH_2 \quad OH \quad\quad\quad\quad CH_2CH_2CH_2 \end{array}$$

by reaction of (1-hydroxycyclohexyl)-phenylacetic acid and 2-heptamethyleniminoethyl halide.

2-diethylaminoethyl (1-hydroxy-4-methylcyclohexyl)-p-methoxyphenylacetate:

$$\begin{array}{c} OCH_3 \\ \text{[phenyl]} \\ CH_2CH_2 \\ \diagup \\ CH_3-CH \quad\quad C-CH-COOCH_2CH_2N(C_2H_5)_2 \\ \diagdown \quad\quad | \\ CH_2CH_2 \quad OH \end{array}$$

by reaction of (1-hydroxy-4-methylcyclohexyl)-p-methoxyphenylacetic acid and 2-diethylaminoethyl halide.

5-dimethylaminophenyl α-(1-hydroxycyclopentyl) - α-phenylacetate benzochloride:

$$\begin{array}{c} CH_2CH_2 \quad C_6H_5 \quad\quad\quad\quad C_6H_5CH_2 \\ \diagdown \quad | \quad\quad\quad\quad\quad\quad | \\ \quad C-CH-COOCH_2CH_2CH_2CH_2CH_2\overset{+}{N}(CH_3)_2 \\ \diagup \quad | \quad\quad\quad\quad\quad\quad | \\ CH_2CH_2 \quad OH \quad\quad\quad\quad\quad Cl \end{array}$$

by reaction of α-(1-hydroxycyclopentyl)-α-phenylacetic acid and 5-dimethylaminopentyl halide, and quaternization of the product with benzyl chloride.

This application is a continuation-in-part of my prior applications Serial Number 540,147 and Serial Number 540,148, filed October 12, 1955, which are in turn continuations-in-part of my prior application Serial Number 215,869, filed March 15, 1951; and all of which applications are now abandoned.

I claim:

1. A member of the group consisting of (A) compounds having the formula $$\begin{array}{c} Ar \\ | \\ R-CH-COO-Y-N=B \end{array}$$

wherein Ar is a member of the group consisting of aromatic carbocyclic radicals of 1–2 rings having less than 15 carbon atoms, 2-thienyl, 3-thienyl, and lower-alkylated thienyl; Y is a lower-alkylene bridge having from 2 to 5 carbon atoms; —N=B is selected from the group consisting of di-lower-alkylamino, 5- to 8-membered polymetheneimino rings, lower-alkylated-5- to 8-membered polymethyleneimino rings, and morpholino; and R is a member of the group consisting of 1-hydroxyalkyl having from 4 to 15 carbon atoms, and, 1-hydroxycycloalkyl having from 5 to 10 carbon atoms, the cycloalkyl ring having from 5 to 8 carbon atoms; (B) acid-addition salts thereof; and (C) quaternary ammonium salts thereof.

2. A compound having the formula $$\begin{array}{c} phenyl \\ | \\ R-CH-COO-Y-N=di\text{ lower-alkyl} \end{array}$$

wherein Y is a lower-alkylene bridge having from 2 to 5 carbon atoms, and R is 1-hydroxyalkyl having from 4 to 15 carbon atoms.

3. A compound having the formula $$\begin{array}{c} phenyl \\ | \\ R-CH-COO-CH_2CH_2N(C_2H_5)_2 \end{array}$$

wherein R is 1-hydroxyalkyl having from 4 to 15 carbon atoms.

4. A compound having the formula $$\begin{array}{c} \text{[thienyl]} \\ CH_2-CH_2 \\ \diagup \quad\quad \diagdown \\ \quad\quad C-CH-COO-Y-N=\text{di-lower-alkyl} \\ \diagdown \quad\quad \diagup \\ (CH_2)_n-CH_2 \quad OH \end{array}$$

wherein Y is a lower-alkylene bridge having from 2 to 5 carbon atoms, and n is an integer from 1 to 2.

5. 2-diethylaminoethyl 2-phenyl-3-hydroxy-4-methylpentanoate having the formula $$\begin{array}{c} CH_3 \quad\quad phenyl \\ | \quad\quad\quad\quad | \\ CH_3CHCH-CH-COOCH_2CH_2N(C_2H_5)_2 \\ \quad\quad | \\ \quad\quad OH \end{array}$$

6. 2-diethylaminoethyl 2-phenyl-3-methyl-3-hydroxypentanoate having the formula $$\begin{array}{c} CH_3CH_2 \quad phenyl \\ \diagdown \quad\quad | \\ \quad C-CH-COOCH_2CH_2N(C_2H_5)_2 \\ \diagup \quad | \\ CH_3 \quad OH \end{array}$$

7. The acid addition salt of beta-(diethylamino)-ethyl ester of 2-phenyl-2-(1-hydroxycyclopentyl)ethanoic acid.

8. The acid addition salt of beta-(diethylamino)-ethyl ester of 2-phenyl-2-(1-hydroxycyclohexyl)ethanoic acid.

9. A compound having the formula $$\begin{array}{c} CH_2CH_2 \quad phenyl \\ \diagup \quad\quad | \\ CH_2 \quad C-CH-COO-Y-N=\text{di lower-alkyl} \\ \diagdown \quad \diagup \quad | \\ CH_2CH_2 \quad OH \end{array}$$

wherein Y is a lower-alkylene bridge having from 2 to 5 carbon atoms.

10. A compound having the formula $$\begin{array}{c} CH_2-CH_2 \quad phenyl \\ \diagup \quad\quad\quad | \\ \quad\quad C-CH-COO-Y-N=\text{di lower-alkyl} \\ \diagdown \quad \diagup \quad | \\ CH_2-CH_2 \quad OH \end{array}$$

wherein Y is a lower-alkylene bridge having from 2 to 5 carbon atoms.

11. 2-diethylaminoethyl (1 - hydroxy - 1 - cyclohexyl)-phenylacetate having the formula $$\begin{array}{c} CH_2CH_2 \quad phenyl \\ \diagup \quad\quad | \\ CH_2 \quad C-CH-COOCH_2CH_2N(C_2H_5)_2 \\ \diagdown \quad \diagup \quad | \\ CH_2CH_2 \quad OH \end{array}$$

12. 2-diethylaminoethyl (1-hydroxy-1-cyclohexyl)-(2-thienyl)acetate hydrochloride.

13. 2-diethylaminoethyl 2-phenyl-3-ethyl - 3 - hydroxypentanoate hydrochloride.

14. A 2-diethylaminoethyl 2-phenyl-3-hydroxyhexanoate hydrochloride.

15. The compound:

$$\begin{array}{c} A\overset{}{C}HCOO(CH_2)_nM \\ | \\ B \end{array}$$

in which A is a group selected from the class consisting of 1-hydroxycyclohexyl and alkyl-substituted 1-hydroxycyclohexyl groups, n is a whole number varying from 2 to 5, M is a quaternary ammonium salt moiety, and B is a radical selected from the class consisting of phenyl and alkoxyphenyl radicals, said alkyl and alkoxy groups each containing 1 to 6 carbon atoms.

16. The compound:

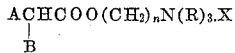

in which A is a member of the group consisting of 1-hydroxycyclohexyl and alkyl-substituted 1-hydroxycyclohexyl groups, n is a whole number varying from 2 to 5, R is an alkyl group, X is a halogen radical selected from the group consisting of chlorine, bromine, and iodine, and B is a member of the group consisting of phenyl and alkoxyphenyl groups, said alkyl and alkoxy groups each containing 1 to 6 carbon atoms.

17. The compound of claim 16 in which A is a 1-hydroxycyclohexyl group and B is a phenyl group.

18. The compound of claim 16 in which A is an alkyl-substituted 1-hydroxycyclohexyl group and B is an alkoxyphenyl group.

19. The quaternary ammonium compound:

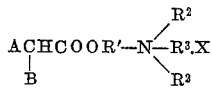

in which A is a group selected from the class consisting of 1-hydroxycyclohexyl and alkyl-substituted 1-hydroxycyclohexyl groups, R' is a bivalent radical containing only carbon and hydrogen and having 2 to 5 carbon atoms and being derived from an aliphatic hydrocarbon by removal of a hydrogen atom from each of two terminal carbon atoms, $R^2$ is an alkyl group, $R^3$ is a univalent radical containing only carbon and hydrogen and being selected from the group consisting of alkyl and aralkyl radicals, X is an anionic moiety selected from the group consisting of a halogen radical, $ArSO_3^-$, and $RSO_4^-$ where Ar is aryl and R is alkyl, said halogen radical being a member of the group consisting of $Cl^-$, $Br^-$, and $I^-$, and B is a radical selected from the class consisting of phenyl and alkoxyphenyl radicals, said alkyl and alkoxy groups each containing 1 to 6 carbon atoms.

20. The methobromide of beta-(diethylamino)ethyl ester of 2-phenyl-2-(1-hydroxycyclohexyl)ethanoic acid.

21. The methohalide of beta-(diethylamino)ethyl ester of 2-phenyl-2-(1-hydroxycyclohexyl)ethanoic acid, said halide moiety being a member of the group consisting of chloride, bromide, and iodide.

22. The compound:

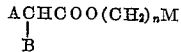

in which A is a group selected from the class consisting of 1-hydroxycyclopentyl and alkyl-substituted 1-hydroxycyclopentyl groups, n is a whole number varying from 2 to 5, M is a quaternary ammonium salt moiety, and B is a radical selected from the class consisting of phenyl and alkoxyphenyl radicals, said alkyl and alkoxy groups each containing 1 to 6 carbon atoms.

23. The compound:

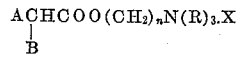

in which A is a member of the group consisting of 1-hydroxycyclopentyl and alkyl-substituted 1-hydroxycyclopentyl groups, n is a whole number varying from 2 to 5, R is an alkyl group, X is a halogen radical selected from the group consisting of chlorine, bromine, and iodine, and B is a member of the group consisting of phenyl and alkoxyphenyl groups, said alkyl and alkoxy groups each containing 1 to 6 carbon atoms.

24. The compound of claim 23 in which A is a 1-hydroxycyclopentyl group and B is a phenyl group.

25. The quaternary ammonium compound:

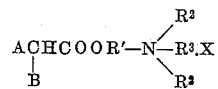

in which A is a group selected from the class consisting of 1-hydroxycyclopentyl and alkoxy-substituted 1-hydroxycyclopentyl groups, R' is a bivalent radical containing only carbon and hydrogen and having 2 to 5 carbon atoms and being derived from an aliphatic hydrocarbon by removal of a hydrogen atom from each of two terminal carbon atoms, $R^2$ is an alkyl group, $R^3$ is a univalent radical containing only carbon and hydrogen and being selected from the group consisting of alkyl and aralkyl radicals, X is an anionic moiety selected from the group consisting of a halogen radical, $ArSO_3^-$, and $RSO_4^-$ where Ar is aryl and R is alkyl, said halogen radical being a member of the group consisting of $Cl^-$, $Br^-$, and $I^-$, and B is a radical selected from the class consisting of phenyl and alkoxyphenyl radicals, said alkyl and alkoxy groups each containing 1 to 6 carbon atoms.

26. A quaternary ammonium salt of 2-diethylaminoethyl α-(1-hydroxy-1-cyclohexyl)-α-phenylacetate.

References Cited in the file of this patent

UNITED STATES PATENTS

| | | |
|---|---|---|
| 1,987,546 | Blankart | Jan. 8, 1935 |
| 2,490,964 | Hoffmann | Dec. 13, 1949 |

FOREIGN PATENTS

| | | |
|---|---|---|
| 505,276 | Belgium | Dec. 1, 1951 |

OTHER REFERENCES

Ford: Journal of the Chemical Society (1947), pp. 56, 58 and 59.

UNITED STATES PATENT OFFICE
Certificate of Correction

Patent No. 2,922,795                                                            January 26, 1960

Frederick F. Blicke

It is hereby certified that error appears in the printed specification of the above numbered patent requiring correction and that the said Letters Patent should read as corrected below.

Column 1, line 70, for "-C(CH₃)₃CH₂-" read — -C(CH₃)₂CH₂- —; same line, for "-CH(CH₃)CH(CH₃-" read — -CH(CH₃)CH(CH₃)- —; column 2, line 25, for "1-hdroxydecyl" read —1-hydroxydecyl—; lines 38 and 39, for "3-methyl-1-hydroxycyclohexy" read —3-methyl-1-hydroxycyclohexyl—; column 6, line 12, for "S₁₂H₁₆O₃S:" read —C₁₂H₁₆O₃S:— lines 16 to 22, the formula should appear as shown below instead of as in the patent:

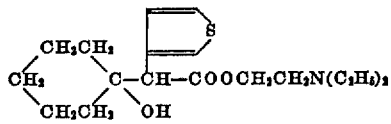

same column 6, line 24, for "-(3-thienyl)acetate acid" read — -(3-thienyl)acetic acid —; line 73, for "-(2-thienyl-acetic" read — -(2-thienyl)acetic —; line 75, for "(2-thienyl ace-" read — (2-thienyl)ace- —; column 7, line 29, for "cyclopenyl)-" read —cyclopentyl)- —; column 8, line 11, for "15.7 f." read —15.7 g.—; column 11, line 30, for "methd" read —method—; column 13, line 46, for "2-diethylmainoethyl" read —2-diethylaminoethyl—; column 14, line 2, for "-2-methylcyclohexy)acetate" read — -2-methylcyclohexyl)acetate —; columns 15 and 16, Table 2(a), fifth column thereof, under the heading "M.P., °C.", last line, for "ᶜ195–196(dec.)" read —ᵉ195–196(dec.)—; column 18, line 63, for "2-diethylamioethyl" read —2-diethylaminoethyl—; column 19, lines 6 to 9, the formula should appear as shown below instead of as in the patent:

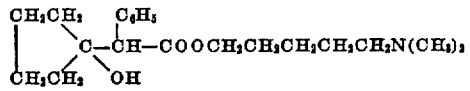

line 46, for "5-dimethylaminophenyl" read —5-dimethylaminopentyl—; column 22, line 26, for "alkoxy-substituted" read —alkyl-substituted—.

Signed and sealed this 6th day of September 1960.

[SEAL]

Attest:
ERNEST W. SWIDER,
*Attesting Officer.*
                                             ROBERT C. WATSON,
                                             *Commissioner of Patents.*